Nov. 12, 1968

E. M. AMIR ET AL 3,410,919

METHOD OF ISOMERIZING POLYMETHYLBENZENE

Filed Dec. 27, 1966

M3-11 — HYDROGENATED 40 HRS. AT 800°F., 250 PSIG.

M3-10 — HYDROGENATED 16 HRS. AT 800°F, ATMOS. PRESS. THEN 12 HRS. AT 800°F., 250 PSIG.

M2-10 — HYDROGENATED 21 HRS. AT 750°F., 230 PSIG.

M2-14 — NO HYDROGENATION PERIOD, FEED STARTED AS TEMPERATURE BROUGHT UP.

INVENTORS.
EMANUEL M. AMIR,
EDWARD F. WADLEY,
ROBERT D. WESSELHOFT,

ATTORNEY 3,410,919
**METHOD OF ISOMERIZING
POLYMETHYLBENZENE**
Emanuel M. Amir, Edward F. Wadley, and Robert D.
 Wesselhoft, Baytown, Tex., assignors to Esso Research
 and Engineering Company
Filed Dec. 27, 1966, Ser. No. 604,853
15 Claims. (Cl. 260—668)

ABSTRACT OF THE DISCLOSURE

Polymethylbenzene is isomerized by contact at isomerization conditions and temperature in the presence of hydrogen with a silica-alumina-molybdenum catalyst which has been exposed to hydrogen pressure for at least 100 hours and then heated in the presence of hydrogen to a temperature within the range from 650° to 850° F., the isomerization temperature being selected to provide the lowest temperature within a selected range of isomerization temperatures consistent with production of a selected level of the selected isomer.

---

This application contains subject matter common to an application, Serial No. 604,789, filed Dec. 27, 1966, for E. M. Amir entitled "Catalyst for Isomerization of Polymethylbenzene."

The present invention is directed to a method of isomerizing a polymethylbenzene in which a shaped silica-alumina molybdenum-containing catalyst is exposed to a pressure of at least 100 p.s.i.g. followed by heating said catalyst in the presence of hydrogen at said pressure to a temperature within the range from about 650° to no greater than 850° F. and maintaining said temperature in the presence of hydrogen for at least 16 hours. The heated catalyst is then contacted with a polymethylbenzene having from 2 to 4 methyl groups at an isomerization temperature within the range from about 500° to about 850° F. under isomerization conditions in the presence of hydrogen to form a selected isomer.

The isomerization conditions include a pressure within the range from about 100 to about 700 p.s.i.g., a feed rate from about 0.1 to about 10 liquid v./v./hour, and a hydrogen to polymethylbenzene mole ratio within the range from about 2:1 to about 20:1, the isomerization temperature being selected to provide the lowest temperature within said range of isomerization temperatures consistent with production of a selected level of the selected isomer as determined by the relationship:

$$K_x = \frac{\text{percent selected isomer}}{\text{percent selected isomer} + \text{sum of the percent of other isomers}}$$

with the maximum theoretical value of $K_x$ being the thermodynamic equilibrium value of the selected isomer at said selected lowest temperature.

The polymethylbenzene which is employed as a feed to the present invention is a polymethylbenzene having from 2 to 4 methyl groups on the benzene ring and includes orthoxylene, metaxylene, and paraxylene, 1, 2, 4-trimethylbenzene, 1,3,5-trimethylbenzene, 1,2,3-trimethylbenzene, and the tetramethylbenzenes including 1,2,4,5-tetramethylbenzene, 1,2,3,5-tetramethylbenzene and 1,2,3,4-tetramethylbenzene.

A catalyst employed in the present invention is the catalyst described and claimed in the Amir application supra. This catalyst is preferably produced by subjecting shapes of silica-alumina containing from about 20% to about 35% by weight of alumina and about 65% to about 80% of silica and containing from about 3% to about 10% by weight molybdenum as $MoO_3$ on a dry basis to drying at a temperature below 650° F. for a time within the range from about one to about five hours. The shapes may preferably be heated to a temperature below about 950° F. before the shapes are impregnated with molybdenum as described in the Amir application supra.

In the method of the present invention, the catalyst must be activated by hydrogen treatment at a pressure of at least 100 p.s.i.g. and a tempertaure in the range from about 650° F. to no greater than 850° F. at said pressure and temperature for at least 16 hours. The catalyst must not be exposed to temperatures in excess of 650° F. in the presence of air or hydrogen at pressures below 100 p.s.i.g. The pressures at which the catalyst is heated and maintained at these temperatures may range from 100 to 1,000 p.s.i.g. The times employed may range from 16 hours up to 100 hours although the heating times may be greater than 100 hours if desired.

The present invention will be further illustrated by reference to the drawing in which.

Figure 1:
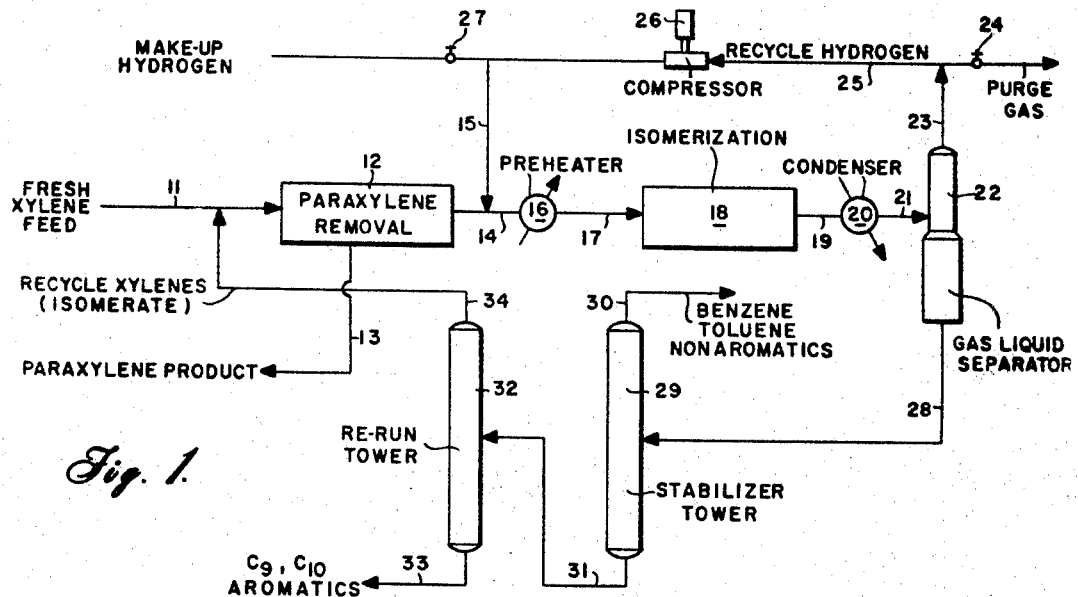
FIG. 1 is a flow diagram illustrating a best mode and embodiment contemplated.

Referring now to the drawing, and particularly to FIG. 1, numeral 11 designates a charge line by way of which a paraxylene-containing fraction boiling within the range from about 277° to about 291° F. obtained from a source not shown is introduced into a paraxylene removal zone 12 which suitably is a low-temperature crystallization zone wherein paraxylene is crystallized and removed as paraxylene crystals by way of line 13. Methods for removing paraxylene from fractions containing paraxylene are well known and, hence, further details thereof are not given. The filtrate from paraxylene removal zone 12 is discharged from zone 12 by line 14 and is admixed with hydrogen introduced by line 15 from a source which will be described further. The mixture of hydrogen and low paraxylene content feed is introduced into a preheating zone 16 wherein the temperature is raised to a temperature within the range from about 500° to about 850° F. and the heated mixture of hydrogen and feed is introduced by line 17 into an isomerization zone 18 which may comprise a vertical bed of silica-alumina molybdenum-containing isomerization catalyst where the feed stock is contacted with the catalyst under isomerization conditions in the presence of hydrogen introduced by line 15.

Prior to initiating the isomerization operation, it is necessary that the catalyst be treated to activate same and to this end the catalyst in isomerization zone 18, prior to starting the feed to zone 18, is pressured to at least 100 p.s.i.g., following which hydrogen is admitted and allowed to flow over the catalyst for a period of 4 to 24 hours until a temperature from about 700° to no greater than 850° F. is attained. Thereafter the temperatures are maintained at said temperature and said pressure for at least 16 hours and preferably a greater number of hours, from 24 to 100 hours. After 100 hours, the catalyst is completely activated. A greater period of activation may be used since no detrimental effects have been observed from over-activation. If the temperature exceeds 850° F., the catalyst is harmed by calcination which causes excessive disproportionation of the feed which the present invention avoids.

After the catalyst in isomerization zone 18 has been suitably activated as described, the feed introduced by line 17 flows therethrough and the xylene is isomerized to the selected isomer as controlled by the isomerization conditions. The isomerized product is discharged from zone 18 by line 19 and passed through a cooler-condenser 20 and, thence, by line 21 into a gas-liquid separator 22 where a separation is made between a gas phase and a liquid phase. The gas phase containing hydrogen is discharged by line 23 and a portion thereof may be vented from the system by opening valve 24 in line 25. Preferably, a major part of the gas from line 23 is recycled by line 25 containing compressor 26 to line 15 for reuse in the process. If insufficient hydrogen is obtained by line 23, make-up hydrogen may be introduced in line 15 by opening valve 27 connecting to an extraneous source of hydrogen not shown.

The liquid phase in separator 22 is withdrawn by line 28 and introduced thereby into a stabilizer zone 29 which suitably is a fractional distillation zone equipped with all auxiliary equipment such as vapor-liquid contacting means, heating means, cooling and condensing means, and the like, to provide a separation of lower boiling products from the selected isomer. In this instance a fraction containing benzene, toluene, and nonaromatics may be discharged from zone 29 by line 30 while a fraction containing paraxylene is discharged by line 31 and introduced thereby into a second fractional distillation tower 32 which may be designated a rerun zone which is similarly equipped to zone 29. A heavier fraction containing $C_9$ and $C_{10}$ aromatics may be discharged from zone 32 by line 33 while the desired product is withdrawn by line 34 which connects to line 11 which introduces same to paraxylene removal zone 12 from which the desired product is recovered by line 13.

It will be seen from the description taken with the drawing that the present invention provides a method for producing and recovering a selected isomer from a polymethylbenzene isomerized product. The feed introduced by line 11 may be a trimethylbenzene or a tetramethylbenzene as may be desired.

In order to illustrate the invention further, reference will now be made to FIG. 2 which is a plot of data wherein the extent of paraxylene production is illustrated by the following relationship:

$$K_x = \frac{\text{percent selected isomer}}{\text{percent selected isomer} + \text{sum of the percent of other isomers}}$$

Figure 2:
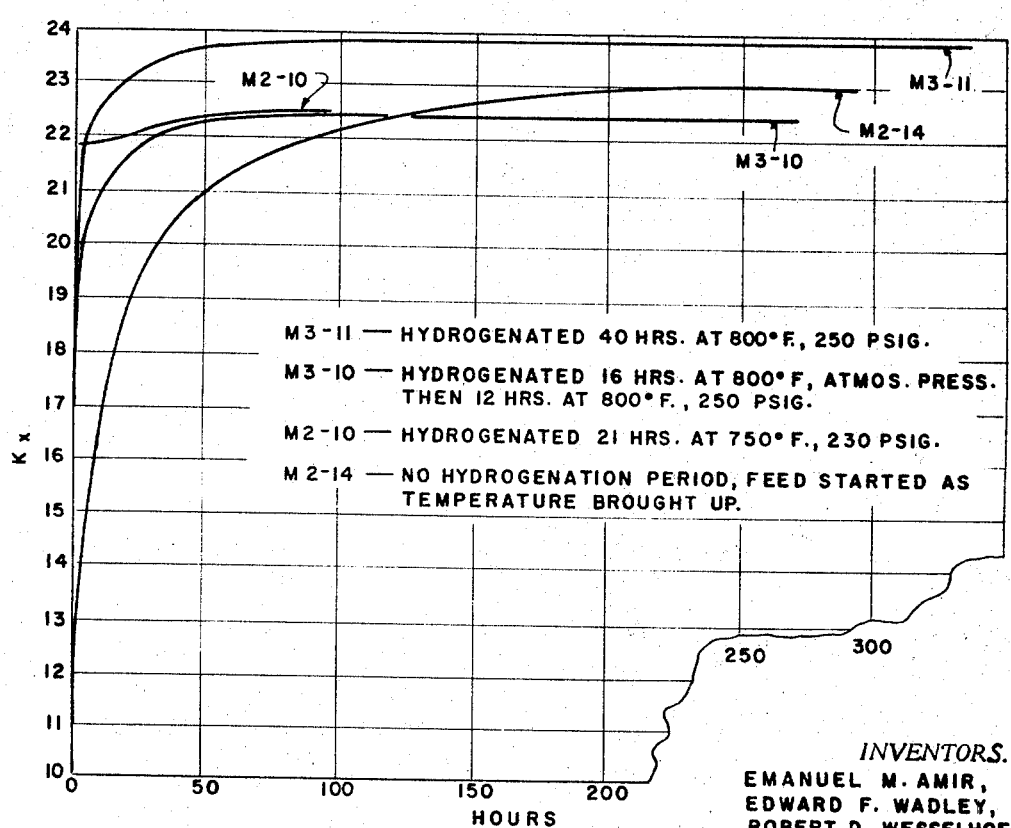
FIG. 2 is a plot of data illustrating the effect of hydrogen activation upon catalyst activity.

FIG. 2 shows the relationship where $K_x$ for paraxylene is plotted against the hours of operation. In run M3–11 where the catalyst was activated by heating for 40 hours in the presence of hydrogen at 800° F., the thermodynamic equilibrium ratio of nearly 24 was achieved at about 75 hours and maintained at this level up to over 300 hours. In run M2–14 there was no activation since the feed xylene was started as the temperature was brought up with hydrogen flow. It will be clear that a $K_x$ value of about 23 was achieved only after about 200 hours of operation. Run M3–10 illustrates an improper startup where the catalyst was subjected to hydrogen for 16 hours at 800° F. at atmospheric pressure then raised to 250 p.s.i.g. for 12 hours at 800° F. It will be noted that in run M3–10 the $K_x$ value was no greater than about 22.2, much lower than run M3–11. In run M2–10, the catalyst was subjected to hydrogen for 21 hours at 750° F. and 230 p.s.i.g. It will be noted that in run M2–10 again the $K_x$ value reached a level of about 22.3, much lower than run M3–11. In all cases in the foregoing runs illustrated in FIG. 2, the space velocity and the hydrogen-to-xylene mole ratio were identical. It will be clear that superior results were obtained in run M3–11 over any of the other runs and these superior results were maintained for a long operating time.

In order to illustrate the invention further, the following three examples are given to illustrate the importance of excluding air from the catalyst during the activation period:

EXAMPLE 1

A charge of catalyst was placed in the reactor and a slow stream of air passed through it while the temperature was slowly raised to 800° F. After three hours, the air was purged with nitrogen, then the catalyst was treated with hydrogen for 16 hours at 800° F. and 230 p.s.i.g. The temperature was reduced to 750° F. and xylene feed was then introduced at 1.0 v./v./hour and 7.2:1 mole $H_2$ per mole feed.

EXAMPLE 2

An identical catalyst charge was placed in the reactor, but it was not heated with air. The air present was displaced with nitrogen, then hydrogen was passed over the catalyst at 230 p.s.i.g. After one hour, the temperature was raised slowly to 800° F. and the catalyst was treated again with hydrogen for 16 hours. The temperature was reduced to 750° F., and the xylene feed was then introduced under the identical conditions of Example 1.

EXAMPLE 3

Catalyst was treated in an identical manner to Example 2 except that it was treated with hydrogen at 230 p.s.i.g. for an additional 96 hours at 750° F. The xylene feed was then introduced at 750° F.

The extent of paraxylene production as measured by $$K_x \left( K_x = \frac{PX}{PX+MX+OX} \times 100 \right)$$

p-XYLENE PRODUCTION, $K_x$, AFTER GIVEN HOURS ON STREAM

| Example | $K_x$ at— | | |
|---|---|---|---|
| | 24 Hours | 100 Hours | 170 Hours |
| 1 | 21.72 | 21.89 | 22.25 |
| 2 | 22.61 | 23.44 | 23.30 |
| 3 | 24.15 | 24.10 | 24.05 |

On comparing Examples 1 and 2, it was clear that where the catalyst was heated in the absence of air but in the presence of hydrogen, improved results were obtained over operating periods up to 170 hours. Much greater improvements were obtained, however, where longer hydrogen treatment was used as shown in Example 3. The length of time of hydrogen treatment depends on the temperature level.

It is important that the catalyst not be exposed to a temperature in excess of 650° F. in the presence of air or hydrogen with the pressure below 100 p.s.i.g., preferably 200 p.s.i.g. It is also important in the present invention to maintain the isomerization temperature at the lowest temperature within the range given while producing a selected level of the selected isomer at maximum catalyst life as determined by the $K_x$ relationship given supra under the operating conditions which have been given herein.

The operating conditions are selected such that the selected isomer is produced in a selected amount, preferably just below its equilibrium level to extend the catalyst life to its maximum and to produce maximum amounts of the selected isomer and minimum amounts of by-products such as result from disproportionation reactions.

Important variables in the present invention are operating pressure, hydrogen to polymethylbenzene mole ratio, and space velocity. These variables are closely related and controlled by contact time and hydrogen partial pressure. These variables may be illustrated by the following 2 runs at greatly different conditions which have comparable contact times and similar conversions:

| Run Number | M3–13 | M1–6 |
|---|---|---|
| Hours on Catalyst | 140 | 140 |
| LHSV, v./v./hr | 0.93 | 2.1 |
| $H_2$/H.C. Ratio | 8.5/1 | 6/1 |
| Pressure, p.s.i.g | 250 | 350 |
| Temperature, °F | 750 | 750 |
| Apparent Contact Time, Sec | 16.3 | 19.7 |
| $K_x$ | 23.5 | 23.6 |
| Disproportionation | 7.0 | 8.2 |

In the practice of the present invention, it is desirable to employ the lowest temperature within the range of isomerization temperatures given which will give the desired $K_x$ values for the selected isomer at the selected lowest temperature. For paraxylene, this may be within the range from about 23 to about 24. Ultimate conversion to paraxylene is equilibrium limited since $K_x$ paraxylene equals 24.2. Hence, for paraxylene it is unnecessary to operate at more severe levels except in certain cases as will be discussed later herein. Operations below about 24, say in the neighborhood of 23 to 23.8, will insure that the operation for paraxylene is not too severe.

After proper activation of the catalyst, as has been described, the temperature is lowered with hydrogen flow over the catalyst. After an induction period, say for example about 200 to 250 hours on xylene feed, the catalyst activity will line out at its maximum. At this time the $K_x$ value may be determined to insure that it is in the proper range. The actual $K_x$ value will be a function of the particular catalyst activity, space velocity, $H_2$:polymethylbenzene ratio, pressure, hydrogen purity, temperature, and feed composition and the severity of the operation may be adjusted to give the desired $K_x$ value. The severity normally is adjusted by changing the pressure or the feed rate.

Figure 3:
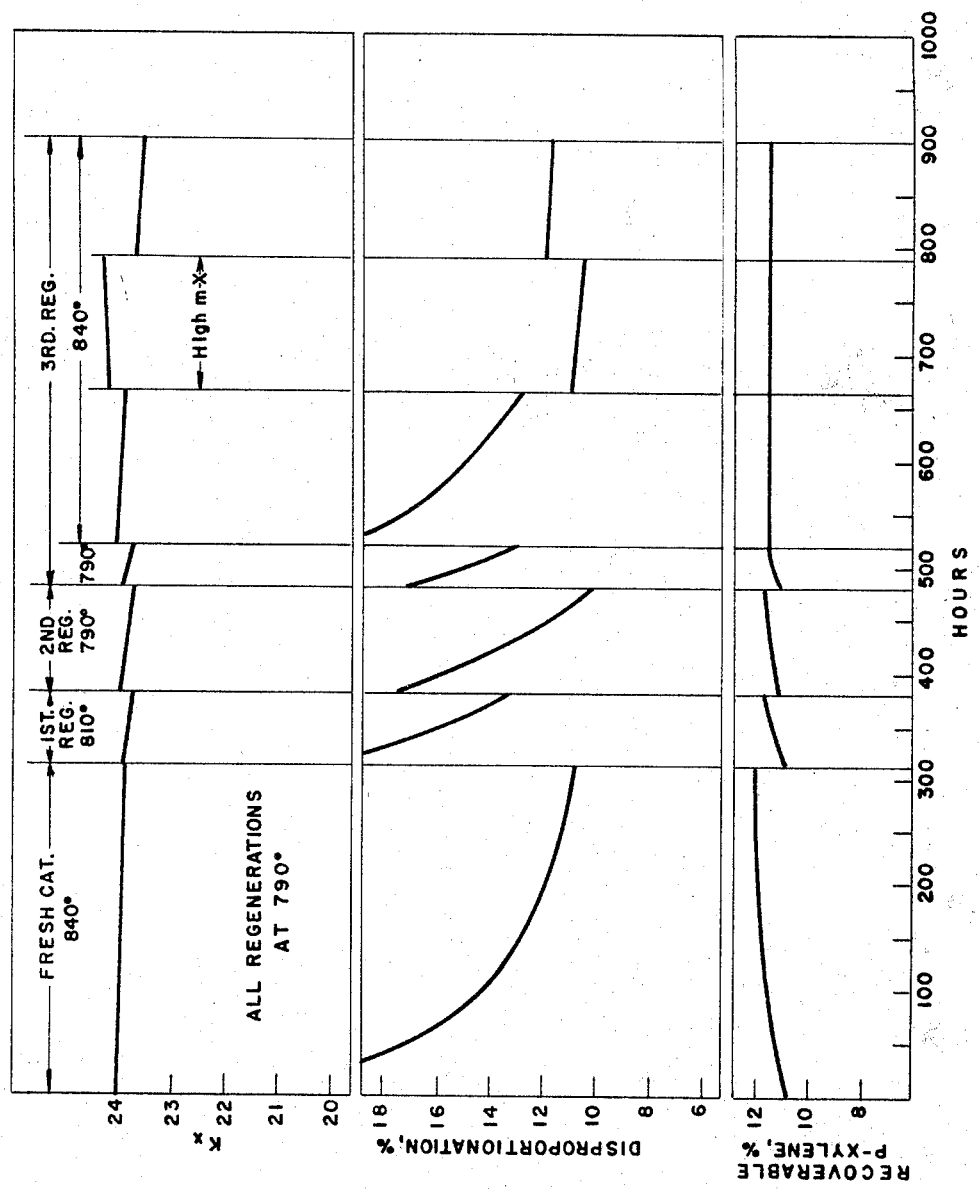
FIG 3 is a plot of data showing the effects of regeneration.

As the activity of the catalyst slowly drops with time of operation, the temperature may be adjusted upward to maintain a desired $K_x$ value. Before reaching 850° F., however, the reaction should be stopped and the catalyst regenerated in order to avoid calcining and subsequent excessive disproportionation, as has been described supra. The catalyst may be regenerated by causing a mixture of 1% oxygen and nitrogen to flow over the mixture of catalyst at 750° F. followed by a repeat burning at 800° F., with complete restoration of catalyst performance. The catalyst should be cooled after regeneration and reactivated as has been described. Reference to FIG. 3 illustrates the effects of three regenerations on catalyst activity as illustrated by the $K_x$ value, disproportionation, and recoverable paraxylene in percent.

A novel aspect of the present invention is the low temperatures that are employed. In other words, with a molybdenum-containing silicia-alumina catalyst, it is possible to operate at the low temperatures without the formation of large amounts of nonaromatics, although at the temperatures employed in the present invention equilibrium favors production of nonaromatics. Thus, an unobvious result is obtained.

The present invention has another desirable feature since it has been found that at high severities of operation disproportionation results. In a recycle operation such as described with respect to FIG. 1, where fresh xylene feed is fed to a paraxylene recovery zone, ethylbenzene in the feed may build up and act as an undesirable diluent. It has been found that the rate of disproportionation of ethylbenzene is higher than the rate of disproportionation of the xylene. Consequently, by operating at high severities the ethylbenzene may be removed at a rate equal to the xylene by disproportionation plus paraxylene product removal. Thus, the ethylbenzene may be kept in balance at a low level.

Feed composition is also important in the present invention since it has been found that this has a marked effect, particularly in the production of paraxylene as illustrated by the $K_x$ value. Feeds in which metaxylene is rich and orthoxylene is at thermodynamic equilibrium or below readily produce paraxylene at equilibrium ($K_x$ = 24.2). On the other hand, if orthoxylene is above equilibrium, much more severe operation is required to produce paraxylene at the selected $K_x$. The net effect is that the higher the level of orthoxylene, the worse the feed. This is illustrated by the following table which gives examples in which the feed was changed from the first to the second feed with the resulting change in product. In run A, with feed 1, the hours on catalyst were 135 whereas with feed 2, the hours on catalyst were 152. The pressure in run A was 230 p.s.i.g., at a temperature of 800° F., a v./v./hr. of 1.2, and a hydrogen to hydrocarbon mole ratio of 7.2. The same conditions prevailed in run B with the exception of hours on catalyst for feed 1 was 2159 and for feed 2 was 2170. In run C the pressure was 250 p.s.i.g., the temperature 750° F., the v./v./hr. 0.93, and the hydrogen to hydrocarbon mole ratio was 8.5. The hours on catalyst for feed 1 in run C was 576 and for feed 2 was 605 hours.

EFFECT OF FEED COMPOSITION ON PRODUCT DISTRIBUTION

| | Run A | | | | Run B | | | | Run C | | | |
|---|---|---|---|---|---|---|---|---|---|---|---|---|
| | Feed 1 | Prod. 1 | Feed 2 | Prod. 2 | Feed 1 | Prod. 1 | Feed 2 | Prod. 2 | Feed 1 | Prod. 1 | Feed 2 | Prod. 2 |
| Non-Aromatics | 1.0 | 1.4 | 0.1 | 0.8 | 0.1 | 0.6 | 0.2 | 0.6 | 0.3 | 0.5 | 0.2 | 0.5 |
| Benzene | | 0.2 | | 1.5 | | 0.8 | | 0.5 | | 0.5 | | 0.4 |
| Toluene | | 5.3 | 0.1 | 4.8 | 0.1 | 7.1 | | 1.9 | | 1.7 | | 1.7 |
| Ethylbenzene | 2.8 | 2.5 | 11.8 | 10.0 | 11.8 | 11.3 | 15.9 | 15.2 | 11.5 | 10.2 | 14.3 | 12.1 |
| Paraxylene | 2.2 | 19.0 | 9.4 | 18.4 | 9.4 | 16.6 | 11.9 | 19.1 | 10.0 | 19.7 | 10.8 | 19.5 |
| Metaxylene | 10.4 | 42.4 | 44.4 | 39.1 | 44.4 | 41.1 | 63.7 | 43.3 | 44.5 | 43.8 | 53.4 | 47.9 |
| Orthoxylene | 83.5 | 21.2 | 32.9 | 18.6 | 32.9 | 24.0 | 8.3 | 16.7 | 33.4 | 20.0 | 21.2 | 19.2 |
| $C_9$ | 0.1 | 6.8 | 1.3 | 5.7 | 1.3 | 3.0 | | 2.3 | 0.3 | 2.9 | 0.2 | 2.9 |
| $C_{10}$ | | 0.6 | 0 | 1.1 | 0 | 0.5 | | 0.5 | | 0.7 | | 0.8 |
| $K_x$ paraxylene | 2.3 | 23.0 | 10.8 | 24.1 | 10.8 | 20.3 | 14.2 | 24.1 | 11.4 | 23.6 | 12.7 | 23.9 |
| $K_x$ orthoxylene | 86.8 | 25.6 | 38.0 | 24.4 | 38.0 | 29.4 | 9.9 | 21.1 | 28.0 | 24.0 | 24.7 | 23.5 |

It will be seen that in each run, the greater the disparity of the $K_x$ ortho from equilibrium ($K_x$ ortho equal $\cong$ 23.5)

the more pronounced is the effect on $K_x$ para upon changing the feed. Also, the lower the content of orthoxylene is in the feed, the better the feed is to produce paraxylene.

As mentioned before, the present invention is applicable, not only to the xylenes, but also to the trimethyl and tetramethyl benzenes. To illustrate the equilibrium values ($K_x$) for the three xylenes, the three trimethylbenzenes, and the three tetramethylbenzenes, the data in the following table is given:

|  | Equilibrium Values, $K_x$ | Operating T., °F. | Min. T., °F. |
|---|---|---|---|
| p-Xylene | 24.2 | | |
| m-Xylene | 52.5 | | |
| o-Xylene | 23.5 | | |
| 1,2,4 trimethylbenzene | 63 | | |
| 1,3,5 trimethylbenzene | 28 | 625 | 570 |
| 1,2,3 trimethylbenzene | 9 | | |
| 1,2,4,5 tetramethylbenzene | 40.5 | | |
| 1,2,3,5 tetramethylbenzene | 50 | 570 | 500 |
| 1,2,3,4 tetramethylbenzene | 9.5 | | |

100–700 p.s.i.g.
H₂/H.C. Ratio, 2–20.
Space Velocity, 0.1–10 v./v./hour.

The nature and objects of the present invention having been completely described and illustrated and the best mode contemplated set forth what we wish to claim as new and useful and secure by Letters Patent is:

1. A method of isomerizing a polymethylbenzene which comprises the steps of:
   exposing a shaped silica-alumina molybdenum containing catalyst to hydrogen pressure of at least 100 p.s.i.g.;
   heating said catalyst in the presence of hydrogen at said pressure to a temperature within the range from about 650° to no greater than 850° F. and maintaining said temperature in the presence of hydrogen for at least 16 hours;
   contacting said heated catalyst with a polymethylbenzene having from 2 to 4 methyl groups at an isomerization temperature within the range from about 500° to 850° F. under isomerization conditions in the presence of hydrogen to form a selected isomer;
   said isomerization conditions including a pressure within the range from about 100 to about 700 p.s.i.g., a feed rate of about 0.1 to about 10 liquid v./v./hour and a hydrogen to polymethylbenzene mole ratio within the range from about 2:1 to about 20:1;
   said isomerization temperature being selected to provide the lowest temperature within said range of isomerization temperatures consistent with production of a selected level of the selected isomer as determined by the relationship:

$$K_x = \frac{\text{percent selected isomer}}{\text{percent selected isomer} + \text{the sum of the percent of other isomers}}$$

where the maximum value of $K_x$ is the thermodynamic equilibrium value of the selected isomer at said selected lowest temperature.

2. A method in accordance with claim 1 in which the polymethylbenzene is a xylene.

3. A method in accordance with claim 1 in which the polymethylbenzene is a trimethylbenzene.

4. A method in accordance with claim 1 in which the polymethylbenzene is a tetramethylbenzene.

5. A method in accordance with claim 1 in which said catalyst is maintained at a temperature below about 650° F. before it is exposed to pressure.

6. A method in accordance with claim 1 in which the temperature within the range from about 650° to no greater than 850° F. is maintained for a time within the range of 16 to about 100 hours.

7. A method in accordance with claim 1 in which the polymethylbenzene is a xylene mixture containing o-xylene in an amount at the most at its equilibrium value, the desired isomer is p-xylene, and $K_x$=about 22.0 to about 24.0.

8. A method in accordance with claim 1 in which the polymethylbenzene is a xylene and the isomerization temperature is within the range from about 650° to 800° F.

9. A method in accordance with claim 1 in which the catalyst is exposed to hydrogen pressure within the range of 100 to 1,000 p.s.i.g.

10. A method in accordance with claim 1 in which the catalyst are shapes of silica-alumina containing from about 20% to about 35% by weight of alumina and about 65% to about 80% by weight silica and containing from about 3% to about 10% by weight molybdenum as $MoO_3$ on a dry basis which have been dried at a temperature below 650° F. for a time within the range from about 1 to about 5 hours.

11. A method in accordance with claim 1 in which the polymethylbenzene is 1,2,4-trimethylbenzene and the desired isomer is 1,3,5-trimethylbenzene.

12. A method in accordance with claim 1 in which the polymethylbenzene is 1,2,3,5-tetramethylbenzene and the desired isomer is 1,2,4,5-tetramethylbenzene.

13. A method of isomerizing a polymethylbenzene which comprises the steps of:
   exposing a shaped silica-alumina molybdenum-containing catalyst to hydrogen pressure of at least 100 p.s.i.g.;
   heating said catalyst in the presence of hydrogen at said pressure to a temperature within the range from about 650° to no greater than 850° F. and maintaining said temperature in the presence of hydrogen for at least 16 hours; and
   contacting said heated catalyst with a polymethylbenzene having from 2 to 4 methyl groups under isomerization conditions including an isomerization temperature in the presence of hydrogen to form a selected isomer;
   said isomerization temperature being selected to provide the lowest temperature within a selected range of isomerization temperatures consistent with production of a selected level of the selected isomer.

14. A method in accordance with claim 13 in which:
   (a) the isomerization conditions include:
     (i) a pressure within the range from about 100 to about 700 p.s.i.g.;
     (ii) a feed rate of about 0.1 to about 10 liquid v./v./hour; and
     (iii) a hydrogen to polymethylbenzene mole ratio within the range from about 2:1 to about 20:1;
   (b) the selected range of isomerization temperatures within the range from about 500° to about 850° F.

15. A method in accordance with claim 13 in which the selected level of the selected isomer is determined by the relationship:

$$K_x = \frac{\text{percent selected isomer}}{\text{percent selected isomer} + \text{the sum of the percent of other isomers}}$$

where the maximum value of $K_x$ is the thermodynamic equilibrium value of the selected isomer at said selected lowest temperature.

References Cited

UNITED STATES PATENTS

| 2,784,241 | 3/1957 | Holm | 260–668 |
| 2,988,575 | 6/1961 | Hayes et al. | 260–668 |
| 3,119,886 | 1/1964 | Smeykal et al. | 260–668 |

DELBERT E. GANTZ, *Primary Examiner.*

C. R. DAVIS, *Assistant Examiner.*